US012471748B1

(12) United States Patent
Helgeson

(10) Patent No.: US 12,471,748 B1
(45) Date of Patent: Nov. 18, 2025

(54) DEBRIS BASKET INDICATOR SYSTEM

(71) Applicant: Nilfisk A/S, Copenhagen (DK)

(72) Inventor: John Helgeson, Shoreview, MN (US)

(73) Assignee: Nilfisk A/S, Copenhagen (DK)

( * ) Notice: Subject to any disclaimer, the term of this patent is extended or adjusted under 35 U.S.C. 154(b) by 0 days.

(21) Appl. No.: 18/665,198

(22) Filed: May 15, 2024

(51) Int. Cl.
*A47L 11/30* (2006.01)
*A47L 11/40* (2006.01)
*G01F 23/18* (2006.01)

(52) U.S. Cl.
CPC ........... *A47L 11/4019* (2013.01); *A47L 11/30* (2013.01); *A47L 11/4008* (2013.01); *A47L 11/4011* (2013.01); *A47L 11/4044* (2013.01); *G01F 23/18* (2013.01)

(58) Field of Classification Search
CPC .. A47L 11/4019; A47L 11/30; A47L 11/4008; A47L 11/4011; A47L 11/4044; G01F 23/18
See application file for complete search history.

(56) References Cited

U.S. PATENT DOCUMENTS 10,678,254 B1 * 6/2020 Jonas .................... A47L 9/2894
11,779,175 B1 * 10/2023 Petersen ............... A47L 9/2805 15/347
2015/0265124 A1 * 9/2015 Chen ................... A47L 11/4055 705/305
2016/0113456 A1 * 4/2016 Kauffman ............. A47L 7/0023 134/109
2016/0331201 A1 11/2016 Goff
2017/0049287 A1 2/2017 Knutson et al.
2017/0224184 A1 * 8/2017 Runnoe ................. E01H 1/0827
2019/0090710 A1 * 3/2019 Marcus ...................... A47L 9/12
2020/0102206 A1 * 4/2020 Bevins ..................... B67D 7/04
(Continued)

FOREIGN PATENT DOCUMENTS

EP 4272617 A1 * 11/2023 ............ A47L 11/201

OTHER PUBLICATIONS

EP 3795054 (Year: 2021).*
ES 2818116 (Year: 2021).*
KR 10141321 (Year: 2014).*

*Primary Examiner* — Alexander Markoff
(74) *Attorney, Agent, or Firm* — Dicke, Billig & Czaja, PLLC

(57) ABSTRACT

A method of detecting a fill level in a debris basket of a cleaning machine include steps of initiating a wet cleaning mode, measuring a pressure differential between a vacuum compartment and a recovery tank, and determining a fill level of a debris basket in response to the measured pressure differential. The cleaning machine includes a scrubbing element mounted to the cleaning machine and engageable with a cleaning surface, a squeegee disposed to capture the debris removed from the cleaning surface by the scrubbing element, and a recovery tank assembly. The recovery tank assembly includes a recovery tank with a cavity disposed to collect liquid cleaning solution used during the wet cleaning mode, a squeegee hose fluidly connected to the recovery tank and disposed to deliver collected used liquid cleaning solution from the squeegee to the recovery tank, a debris basket disposed in the recovery tank and fluidly connected with the squeegee hose, and a vacuum compartment adjacent the recovery tank.

8 Claims, 5 Drawing Sheets

(56) References Cited

U.S. PATENT DOCUMENTS

| | | | | |
|---|---|---|---|---|
| 2022/0265108 | A1* | 8/2022 | Kauffman | A47L 11/4066 |
| 2023/0363607 | A1 | 11/2023 | Niemke | |
| 2024/0268620 | A1* | 8/2024 | Chen | A47L 11/4055 |

* cited by examiner

DEBRIS BASKET INDICATOR SYSTEM

BACKGROUND

The present disclosure generally relates to cleaning machines. In particular, the present disclosure relates to a debris basket indicator for a cleaning machine.

Existing wet process cleaning machines can apply a liquid cleaning solution from an on-board cleaning solution tank onto the floor through nozzles. Rotating brushes forming part of the scrubber agitate the solution to loosen dirt and grime adhering to the floor. The dirt and grime become suspended in the solution, which is collected by a vacuum squeegee fixed to a rearward portion of the scrubber and deposited into an onboard recovery tank. The recovery tank can include a debris basket to collect solid debris from the solution. If the debris basket becomes too full, or if debris clogs the squeegee the ability of the cleaning machine to continue collecting cleaning solution can be negatively impacted. Existing designs for cleaning machines can require manual inspection of the debris basket and/or squeegee hose by the operator. This manual inspection can result in the debris basket going unchecked and can cause a decrease in cleaning performance which can lead to dirty floors after the cleaning machine has "cleaned."

The inventors have recognized that there is a need for a more efficient and reliable way of monitoring a level of debris within the debris basket and/or obstruction of the squeegee hose during operation of the cleaning machine.

SUMMARY

This disclosure presents a method of detecting a fill level in a debris basket of a cleaning machine. The method include steps of initiating a wet cleaning mode, measuring a pressure differential between a vacuum compartment and a recovery tank, and determining a fill level of a debris basket in response to a the measured pressure differential. The cleaning machine includes a scrubbing element mounted to the cleaning machine and engageable with a cleaning surface, a squeegee disposed to capture the debris removed from the cleaning surface by the scrubbing element, and a recovery tank assembly. The recovery tank assembly includes a recovery tank with a cavity disposed to collect liquid cleaning solution used during the wet cleaning mode, a squeegee hose fluidly connected to the recovery tank and disposed to deliver collected used liquid cleaning solution from the squeegee to the recovery tank, a debris basket disposed in the recovery tank and fluidly connected with the squeegee hose, and a vacuum compartment adjacent the recovery tank.

This disclosure also presents a method of monitoring a debris level within such a cleaning machine as mentioned above, where the method includes initiating a wet cleaning mode and measuring a rate of change of a pressure differential between the vacuum compartment and the recovery tank. Blockage of the squeegee hose by debris is detected based on this measured rate of change.

This disclosure further presents versions of a cleaning machine as mentioned above.

The present summary is provided only by way of example, and not limitation. Other aspects of the present disclosure will be appreciated in view of the entirety of the present disclosure, including the entire text, claims, and accompanying figures.

Figure 1:
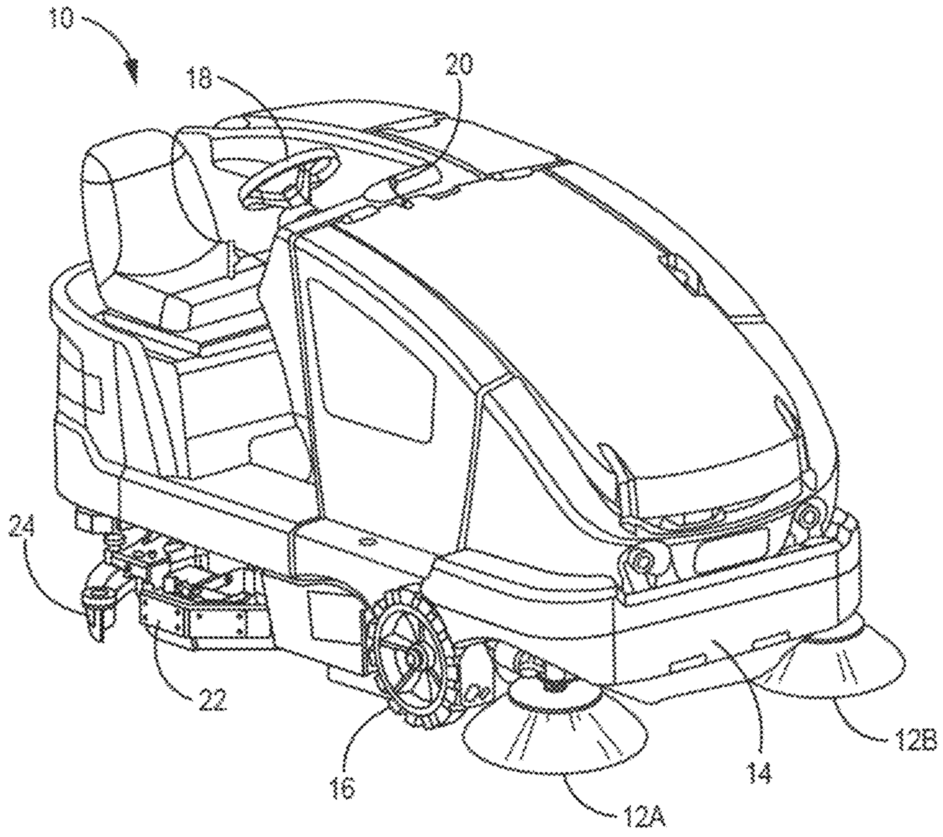
FIG. 1 shows a perspective view of a cleaning machine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The proposed disclosure presents a debris monitoring system designed for use in floor sweeper recovery tanks and associated components. In particular, this disclosure involves continuous monitoring of the recovery tank using a pressure sensor, with the sensor's output generally being proportional to a fill level of the debris basket or a debris blockage of the squeegee hose.

FIG. 1 shows a perspective view of cleaning machine 10 with cleaning elements 12, hopper 14, wheels 16, steering component 18, display 20, scrubber 22, squeegee 24, and recovery tank assembly 26.

In an embodiment, cleaning machine 10 is configured as at least one of ride on a sweeper, a vacuum, a scrubber, or a combination thereof. In another embodiment, cleaning machine 10 can be configured as at least one of a walk behind machine, a ride-on machine, a partially autonomous machine, a fully autonomous machine, or a combination thereof.

Cleaning elements 12 can be sweeper elements, such as rotating or spinning sweeper elements. In another embodiment, cleaning machine 10 can include a cylindrical brush sweeping element. Additionally, or alternatively, cleaning machine 10 can include a vacuum to draw air, water, and particulate into cleaning machine (and distributed into recovery tank 30 of FIG. 2). Hopper 14 is a container for collecting dry debris collected by cleaning machine 10. For example, hopper 14 can define a cavity configured for receiving and collecting debris picked up from a cleaning surface by cleaning machine 10 (e.g., by way of first cleaning elements 12 or another component of cleaning machine 10).

Wheels 16 (only one is visible in the view of FIG. 1) are configured to at least one of steering, driving, or a combination thereof of cleaning machine 10. Steering component 18 is a physical device for receiving steering and driving input from a user. For example, steering component 18 can include at least one of a wheel, a handle, a knob, or a combination thereof. Display 20 can be a screen or panel including one or more indicators for indicating information to a user. In an embodiment, display 20 can include at least one of a single indicator light, a lamp, a user interface, a tablet, or a combination thereof. In an embodiment, display 20 can be separate from steering component 18. In another embodiment, display 20 can be combined with steering component 18. In another embodiment, at least one of steering component 18, display 20, or a combination thereof can be connected to and in communication with a controller (not shown in FIG. 1) of cleaning machine 10. As will be discussed below with respect to subsequent figures, display 20 can be in communication with a debris monitoring system of cleaning machine 10 and configured to display notifications from the hopper indicator system to a user.

Scrubber 22 can be configured to provide a cleaning action to the floor, such rotary disc, orbital or cylindrical cleaning. In an embodiment, scrubber 22 can therefore include one or more rotating brushes. Fluid from a liquid cleaning system can be dispensed by cleaning machine 10 to facilitate scrubbing performed by scrubber 22. A liquid system can be internally housed within cleaning machine 10 and can include a solution storage tank (shown in FIG. 2), a pump system, and spray nozzles, as discussed below. Squeegee 24 can be used to corral or wipe dirty liquid behind scrubber 22 and can be connected to recovery tank assembly 26 as is discussed in greater detail below with respect to subsequent figures.

Figure 2:
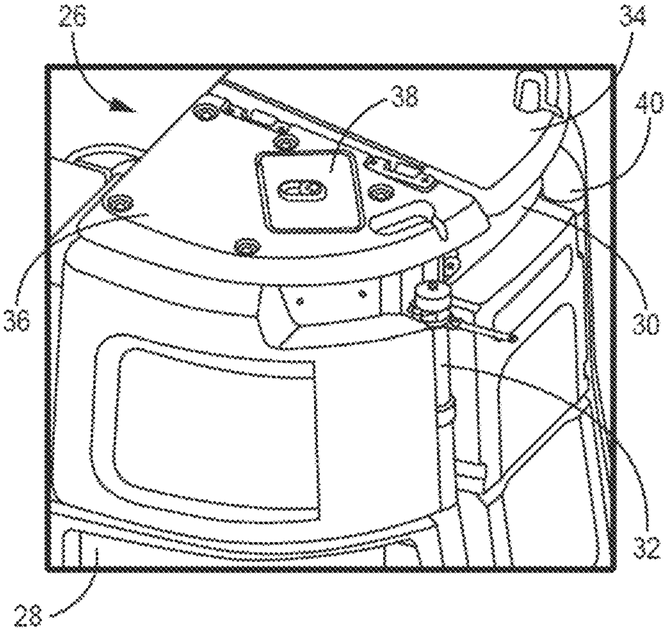
FIG. 2 shows a partial perspective view of a recovery tank assembly of the cleaning machine of FIG. 1.

FIG. 2 shows an isolated partial perspective view of recovery tank assembly 26 and solution storage tank 28. Solution storage tank 28 can be fluidly connected to the liquid system of cleaning machine 10 for dispensing a liquid cleaning solution onto the floor or surface being cleaned. Recovery tank assembly 26 includes recovery tank 30, recovery tank drain hose 32, recovery tank lid 34, vacuum lid 36 and vacuum filter 38 (belonging to a vacuum system shown in FIG. 3), and squeegee hose 40.

Squeegee hose 40 can be a suction tube for vacuuming up dirty liquid (i.e., used liquid cleaning solution) collected by squeegee 24. Squeegee hose 40 can therefore be fluidly connected to recovery tank 30, which stores the collected dirty liquid. Recovery tank drain hose 32 can be used to empty the liquid contents of recovery tank 30, and is therefore also fluidly connected to recovery tank 30. Recovery tank lid 34 provides access to the internal volume of recovery tank 30, for example, for removing debris from the internal debris basket (shown schematically in FIG. 4).

Figure 3:
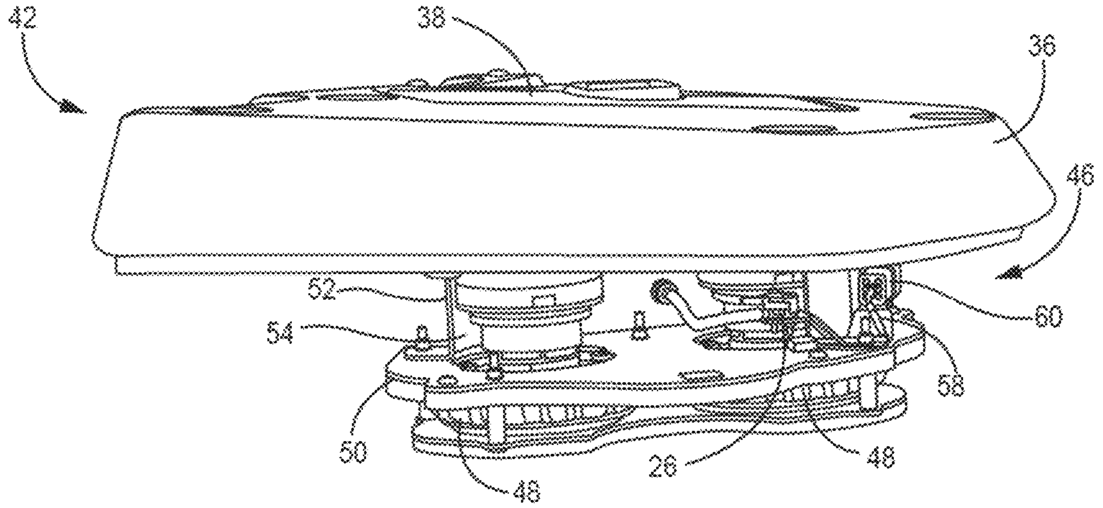
FIG. 3 shows a perspective view of a vacuum system belonging to the recovery tank assembly of FIG. 2.
Figure 4:
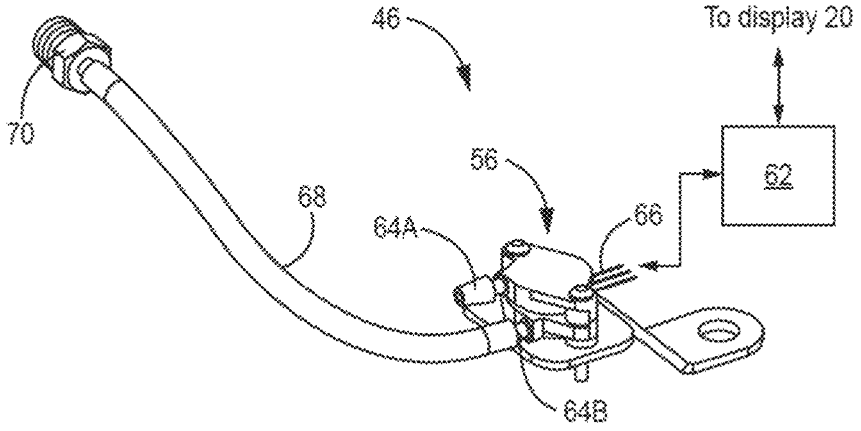
FIG. 4 shows an isolated perspective view of pressure sensor housed within a vacuum compartment of the recovery tank assembly.

FIG. 3 shows a perspective view of vacuum system 42 belonging to recovery tank assembly 26. FIG. 4 shows an isolated perspective view of pressure sensor 44 belonging to debris monitoring system 46 of recovery tank assembly 26. FIGS. 3 and 4 are discussed together.

Vacuum system 42 includes vacuum lid 36, vacuum filter 38, vacuum motors 48, gasket 50, and partition 52. Vacuum lid 36, gasket 50, and partition 52 help to define a fluidly sealable vacuum compartment 54 (shown in FIG. 5) which remains free of liquids to keep its various components dry. Vacuum motors 48 can be operatively connected to recovery tank 30 and/or squeegee hose 40 for drawings dirty liquid through squeegee hose 40 and into recovery tank 30. An alternative embodiment can have a single motor 48 or more than two motors 48.

At least a portion of debris monitoring system 46 can be housed within vacuum compartment 54. Debris monitoring system 46 includes pressure sensor 56 wire harness 58, harness connector 60, and controller 62. Pressure sensor 56 can include first port 64A, second port 64B, and leads 66. First port 64A can be configured to sense an ambient pressure within vacuum compartment 54 and second port can be operatively connected to recovery tank 30 via tube 68 for sensing a vacuum pressure within recovery tank 30. Tube 68 can include distal end 70, that is, distal with respect to second port 64B. Distal end 70 of tube 68 can include threading or other suitable means for interfacing with partition 52 as is discussed in greater detail below. In this regard, pressure sensor 56 can be any sensor suitable for sensing a pressure differential between vacuum compartment 54 and recovery tank 30. Wire harness 58 and harness connector 60 can be used to electrically connect pressure sensor 56 to an electrical system within cleaning machine 10 for providing power to pressure sensor 56. Wire harness 58 and harness connector 60 also permit easy physical installation and/or removal of sensor 56 from vacuum compartment 54. Pressure sensor 56 can be in communication with controller 62 via wired and/or wireless connection. In this embodiment, pressure sensor 56 can be connected to controller 62 via leads 66. Controller 62 is shown as a simplified block icon for clarity.

Figure 5:
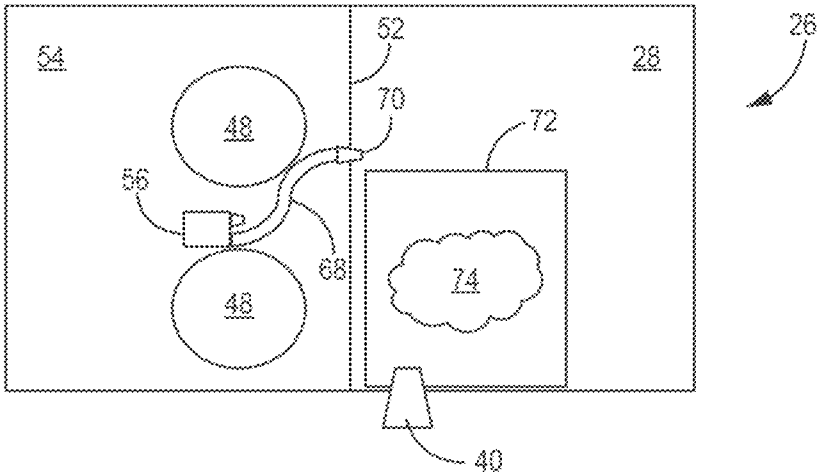
FIG. 5 is a schematic illustration of the recovery tank assembly.

FIG. 5 schematically illustrates debris basket 72 of recovery tank assembly 26 and is discussed with continued reference to FIGS. 2-4. As shown in FIG. 5, partition 52 divides recovery tank 30 and vacuum compartment 54. Vacuum motors 48 and pressure sensor 56 are disposed within vacuum compartment 54. Debris basket 72 is disposed within recovery tank and is in fluid communication with squeegee hose 40. Debris basket 72 can be a container suitable for allowing a liquid portion of the dirty liquid collected by squeegee hose 40 to pass therethrough and into recovery tank 30, while retaining solid material, or debris 74. For this purpose, debris basket 72 can include drainage apertures or be at least partially perforated. Pressure sensor 56 is operatively connected to recovery tank 30 via distal end 70 of tube 68 which can extend through or otherwise interface with partition 52.

The operator of cleaning machine 10 can initiate a "wet cleaning" mode in which one or more of scrubber 22, liquid solution tank 28, squeegee 24, and recovery tank system 26 are operating. While engaged in wet cleaning, pressure sensor 56 can continuously monitor the pressure within vacuum compartment 54 (i.e., via first port 64A) and the pressure within recovery tank 30 (i.e., via second port 64B and tube 68). In one embodiment, the ambient pressure within vacuum compartment 54 is generally close to atmospheric pressure, or 1 atm. Recovery tank 30, on the other hand, tends to experience a vacuum pressure caused by operation of vacuum motors 48 to draw dirty liquid into recovery tank. In general, this vacuum pressure will be lower than atmospheric pressure, resulting in a negative pressure differential from vacuum compartment 54 to recovery tank 30. An increase in this pressure differential can be caused by and proportional to an increase of debris 74 within debris basket 72 and/or squeegee hose 40 because the presence of debris 74 causes vacuum motors 48 to operate at higher a higher RPM to maintain suction within recovery tank system 26. For example, the pressure differential of a partially full debris basket 72 or a partially clogged squeegee hose 40 will be less than when debris basket 72 is at capacity or if squeegee hose 40 is fully blocked.

Pressure sensor 56 is configured to sense the pressure differential between vacuum compartment 54 and recovery tank 30 and outputs the sensed data to controller 62. Controller 62 can communicate a debris status based on the pressure differential readings to, for example, display 20 for the operator to view and evaluate. A baseline pressure differential for an "empty" debris basket 72 can be used as a reference upon which various incremental (e.g., 40% full, 50% full, etc.) and critical (e.g., 100% full, etc.) level indications can be extrapolated. An optional prompt to check and/or empty debris basket 72 can also be generated.

Sensor 56 can further be configured to sense and output a rate of change of the pressure differential. A sudden increase in the pressure differential beyond a predetermined threshold value can, for example, indicate a blockage or other fault condition of squeegee hose 40, a status which also can be transmitted to display 20 along with an optional prompt to clear the blockage. As such the operator of cleaning machine 10 can receive real time debris status information for the recovery tank system allowing for timely intervention by the operator.

DISCUSSION OF POSSIBLE EMBODIMENTS

The following are non-exclusive descriptions of possible embodiments of the present invention.

A method of detecting a fill level in a debris basket of a cleaning machine, the method comprising: initiating a wet cleaning mode of the cleaning machine, the cleaning machine comprising: a scrubbing element mounted to the cleaning machine and engageable with a cleaning surface; a squeegee disposed to capture the debris removed from the cleaning surface by the scrubbing element; a recovery tank assembly comprising: a recovery tank defining a cavity therein, wherein the recovery tank is disposed to collect liquid cleaning solution used during the wet cleaning mode of the cleaning machine; a squeegee hose connected to and in fluid communication with the recovery tank, wherein the squeegee hose is disposed to deliver collected used liquid cleaning solution from the squeegee to the recovery tank; a debris basket disposed within the recovery tank and in fluid communication with the squeegee hose to retain debris from the used liquid cleaning solution; and a vacuum compartment adjacent the recovery tank and defining a cavity therein; measuring, with a pressure sensor disposed within the vacuum compartment, a pressure differential between the vacuum compartment and the recovery tank; and determining the fill level of the debris basket in response to the measured pressure differential.

The method of the preceding paragraph can optionally include, additionally and/or alternatively, any one or more of the following features, configurations and/or additional components:

A further embodiment of the foregoing method, wherein the fill level of the debris basket is proportional to the measured pressure differential.

A further embodiment of the foregoing method, further comprising: measuring, with the pressure sensor, a rate of change of the pressure differential; determining a blockage of the squeegee hose in response to the measured rate of change; and indicating the blockage of the squeegee hose if the rate of change achieves a predetermined threshold value.

A further embodiment of the foregoing method, further comprising: indicating the fill level of the basket based on the measured pressure differential.

A further embodiment of the foregoing method, wherein indicating the blockage of the squeegee hose and the fill level of the debris basket includes displaying a status on a display of the cleaning machine.

A further embodiment of the foregoing method, further comprising: generating a prompt for an operator of the cleaning machine.

A further embodiment of the foregoing method, wherein the step of measuring the pressure differential between the vacuum compartment and the recovery tank comprising measuring a first pressure within the vacuum compartment with a first sensor port and measuring a second pressure within the recovery tank with a second pressure port.

A further embodiment of the foregoing method, wherein pressure differential between the vacuum compartment and the recovery tank is continuously measured.

The following are non-exclusive descriptions of possible embodiments of the present invention.

A method of monitoring a debris level within a cleaning machine, the method comprising: initiating a wet cleaning mode of the cleaning machine, the cleaning machine comprising: a scrubbing element mounted to the cleaning machine and engageable with a cleaning surface; a squeegee disposed to capture the debris removed from the cleaning surface by the scrubbing element; a recovery tank assembly comprising: a recovery tank defining a cavity therein, wherein the recovery tank is disposed to collect liquid cleaning solution used during the wet cleaning mode of the cleaning machine; a squeegee hose connected to and in fluid communication with the recovery tank, wherein the squeegee hose is disposed to deliver collected used liquid cleaning solution from the squeegee to the recovery tank; a debris basket disposed within the recovery tank and in fluid communication with the squeegee hose to retain debris from the used liquid cleaning solution; and a vacuum compartment adjacent the recovery tank and defining a cavity therein; measuring, with a pressure sensor disposed within the vacuum compartment, a pressure differential between the vacuum compartment and the recovery tank; measuring a rate of change of the pressure differential; and determining a blockage of the squeegee hose with debris in response to the measured rate of change.

The method of the preceding paragraph can optionally include, additionally and/or alternatively, any one or more of the following features, configurations and/or additional components:

A further embodiment of the foregoing method, further comprising: indicating the blockage of the squeegee hose if the rate of change achieves a predetermined threshold value.

A further embodiment of the foregoing method, further comprising: determining the fill level of the debris basket in response to the measured pressure differential.

A further embodiment of the foregoing method, further comprising: indicating the fill level of the basket based on the measured pressure differential.

A further embodiment of the foregoing method, wherein indicating the blockage of the squeegee hose and the fill level of the debris basket includes displaying a status on a display of the cleaning machine.

A further embodiment of the foregoing method, further comprising: generating a prompt for an operator of the cleaning machine A further embodiment of the foregoing method, wherein pressure differential between the vacuum compartment and the recovery tank is continuously measured.

A cleaning machine comprising: a scrubbing element mounted to the cleaning machine and engageable with a cleaning surface; a squeegee disposed to capture the debris removed from the cleaning surface by the scrubbing element; a recovery tank assembly comprising: a recovery tank defining a cavity therein, wherein the recovery tank is disposed to collect liquid cleaning solution used during a wet cleaning mode of the cleaning machine; a squeegee hose connected to and in fluid communication with the recovery tank, wherein the squeegee hose is disposed to deliver collected used liquid cleaning solution from the squeegee to the recovery tank; a debris basket disposed within the recovery tank and in fluid communication with the squeegee hose to retain debris from the used liquid cleaning solution; a vacuum compartment adjacent the recovery tank and defining a cavity therein; a vacuum system disposed within the vacuum compartment, the vacuum system comprising at least one vacuum motor operatively connected to the squeegee hose for providing suction to the squeegee hose; and a pressure sensor disposed within the vacuum compartment, the pressure sensor comprising: a first port in communication with the vacuum compartment; and a second port in communication with the recovery tank.

The cleaning machine of the preceding paragraph can optionally include, additionally and/or alternatively, any one or more of the following features, configurations and/or additional components:

A further embodiment of the foregoing cleaning machine, further comprising: a controller in communication with the pressure sensor for receiving a pressure measurement from the pressure sensor.

A further embodiment of the foregoing cleaning machine, further comprising: a display in communication with the controller for displaying a debris level corresponding to the pressure measurement.

A further embodiment of the foregoing cleaning machine, further comprising: a partition partially defining the vacuum compartment and fluidly separating the vacuum compartment from the recovery tank.

A further embodiment of the foregoing cleaning machine, wherein the recovery tank assembly further comprises: a lid; and a drainage hose.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The invention claimed is:

1. A method of detecting a fill level in a debris basket of a cleaning machine, the method comprising:

initiating a wet cleaning mode of the cleaning machine, the cleaning machine comprising:
- a liquid cleaning system to dispense a liquid cleaning solution from a liquid storage tank onto a cleaning surface;
- a cleaning element engageable with the cleaning surface, the cleaning element configured to provide a cleaning action using the liquid cleaning solution to remove debris from the cleaning surface when engaged;
- a squeegee disposed to collect the liquid cleaning solution and debris removed from the cleaning surface by the cleaning element;
- a recovery tank assembly comprising:
  - a recovery tank defining a cavity therein, wherein the recovery tank is disposed to retain the liquid cleaning solution;
  - a squeegee hose connected to and in fluid communication with the recovery tank from the squeegee, wherein the squeegee hose is disposed to deliver the liquid cleaning solution collected by the squeegee to the recovery tank;
  - a debris basket disposed within the recovery tank and in fluid communication with the squeegee hose to retain debris from the used liquid cleaning solution; and
  - a vacuum system to draw the liquid cleaning solution and debris through the squeegee hose and into the recovery tank, the vacuum system including a vacuum compartment, wherein the vacuum compartment is disposed adjacent the recovery tank; and
- a debris monitoring system comprising a pressure sensor, wherein the pressure sensor is disposed within the vacuum compartment, and wherein the pressure sensor is operatively connected to the recovery tank;

measuring a pressure differential between the vacuum compartment and the recovery tank with the pressure sensor; and determining the fill level of the debris basket in response to the pressure differential.

2. The method of claim 1, wherein the fill level of the debris basket is proportional to the pressure differential.

3. The method of claim 2 and further comprising:

measuring, with the pressure sensor, a pressure differential rate of change;

determining a blockage of the squeegee hose in response to the pressure differential rate of change; and indicating, on a display, the blockage of the squeegee hose if the pressure differential rate of change achieves a predetermined threshold value.

4. The method of claim 3 and further comprising: indicating the fill level of the debris basket based on the pressure differential.

5. The method of claim 4, wherein indicating the blockage of the squeegee hose and the fill level of the debris basket includes displaying a status on a display of the cleaning machine.

6. The method of claim 5 and further comprising: generating a prompt on the display for an operator of the cleaning machine to take an action related to the blockage of the squeegee hose and the fill level of the debris basket.

7. The method of claim 1, wherein the step of measuring the pressure differential between the vacuum compartment and the recovery tank comprising measuring a first pressure within the vacuum compartment with a first sensor port of the pressure sensor and measuring a second pressure within the recovery tank with a second pressure port of the pressure sensor.

8. The method of claim 1, wherein pressure differential between the vacuum compartment and the recovery tank is continuously measured.

* * * * *